(12) United States Patent
Shin

(10) Patent No.: US 6,182,150 B1
(45) Date of Patent: Jan. 30, 2001

(54) COMPUTER CONFERENCING SYSTEM WITH A TRANSMISSION SIGNAL SYNCHRONIZATION SCHEME

(75) Inventor: Seong-Kee Shin, Suwon (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/038,323

(22) Filed: Mar. 11, 1998

(30) Foreign Application Priority Data

Mar. 11, 1997 (KR) .................................................. 97-8062

(51) Int. Cl.[7] ............................. G06F 15/16; G06F 15/17
(52) U.S. Cl. ........................................... 709/248; 709/204
(58) Field of Search .................................... 709/248, 204; 379/202; 370/424

(56) References Cited

U.S. PATENT DOCUMENTS

| 5,195,086 | | 3/1993 | Baumgartner et al. . |
| 5,231,633 | * | 7/1993 | Hluchyj et al. ................ 370/94.1 |
| 5,410,343 | * | 4/1995 | Coddington et al. ................ 348/7 |
| 5,434,913 | * | 7/1995 | Tung et al. ........................ 379/202 |
| 5,506,954 | | 4/1996 | Arshi et al. . |
| 5,524,110 | | 6/1996 | Danneels et al. . |
| 5,534,914 | | 7/1996 | Flohr et al. . |
| 5,546,324 | | 8/1996 | Palmer et al. . |
| 5,608,653 | | 3/1997 | Palmer et al. . |
| 5,625,404 | | 4/1997 | Grady et al. . |
| 5,668,811 | * | 9/1997 | Worsley et al. ................... 370/424 |
| 5,712,906 | | 1/1998 | Grady et al. . |
| 5,717,857 | | 2/1998 | Burkman et al. . |

* cited by examiner

Primary Examiner—Mark H. Rinehart
Assistant Examiner—Paul Kang
(74) Attorney, Agent, or Firm—Robert E. Bushnell, Esq.

(57) ABSTRACT

A computer conferencing system is provided with a transmission signal synchronization scheme. An Audio signal frame has a synchronization (sync) signal. The formatted audio including the sync signal is transmitted, together with the video signal frame and data signal frame, to the remote conferencing system via a communications network, such as a PSTN. The conferencing system is provided with a synchronization signal generator coupled to the compressed signal output of the audio board by way of a mixer. Further, the system includes a multiplexer/demultiplexer that mutiplexes/demultiplexes compressed and formatted audio/video/data generated by the audio board, video board, and host processor, respectively, with the communication board for transmission to and reception from the remote conferencing system. A synchronization control unit is coupled to data input lines of the multiplexer/demultiplexer for enabling/disabling addition of the sync signal to the audio signal frame, and for selecting a sync signal source according to the priority set by a software module.

17 Claims, 6 Drawing Sheets

COMPUTER CONFERENCING SYSTEM WITH A TRANSMISSION SIGNAL SYNCHRONIZATION SCHEME

CLAIM OF PRIORITY

This application makes reference to, incorporates the same herein, and claims all benefits accruing under 35 U.S.C. §119 from an application for A COMPUTER CONFERENCING SYSTEM WITH TRANSMISSION SIGNALS SYNCHRONIZING SCHEME earlier filed in the Korean Industrial Property Office on the 11$^{th}$ of March 1997 and there duly assigned Serial No. 8062/1997.

TECHNICAL FIELD

The present invention relates to a computer conferencing system, and more particularly to audio, video, and data conferencing between two computer systems in which a stream of multiplexed formatted data is transmitted over a communications link.

RELATED ART

There is known a computer conferencing system which provides real-time audio, video, and data conferencing between personal computer systems. Each personal computer system has a conferencing system, a camera, a microphone, a monitor, and a speaker. The conferencing systems communicate via a communications network.

In such conferencing systems, audio, video and data signals are typically multiplexed, and are then transmitted to a remote site asynchronously via the communications network. In certain cases, such as in the case of a PSTN network, many errors can occur due to characteristics of the transmission line. This can result in discrepancies between the original data and the data received after transmission, and after reconstruction of the compressed formatted data is performed at the remote site.

Therefore, there is a need in the art for development of a conferencing system which overcome the aforementioned problems, as well as other problems mentioned herein. That is to say, there is a need for the development of a computer conferencing system which can provide synchronization of audio, video and data signals transmitted over a communications link.

The following patents are considered to be representative of the prior art relative to the present invention, and are burdened by the disadvantage discussed above: U.S. Pat. No. 5,717,857 to Burkman et al., entitled System For Switching Data Connection To Use First Channel And Second Channel Without Substantial Interruption Of Transfer Of Audio Signals And Image Data Between Computers, U.S. Pat. No. 5,712,906 to Grady et al., entitled Communications Systems Supporting Shared Multimedia Session, U.S. Pat. No. 5,668,811 to Worsley et al., entitled Method Of Maintaining Frame Synchronization In A Communication Network, U.S. Pat. No. 5,625,404 to Grady et al., entitled Method And System For Accessing Multimedia Data Over Public Switched Telephone Network, U.S. Pat. No. 5,608,653 to Palmer et al., entitled Video Teleconferencing For Networked Workstations, U.S. Pat. No. 5,546,324 to Palmer et al., entitled Video Teleconferencing For Networked Workstations, U.S. Pat. No. 5,534,914 to Flohr et al., entitled Videoconferencing System, U.S. Pat. No. 5,524,110 to Danneels, entitled Conferencing Over Multiple Transports, U.S. Pat. No. 5,506,954 to Arshi et al., entitled PC-Based Conferencing System, U.S. Pat. No. 5,434,913 to Tung et al., entitled Audio Subsystem For Computer-Based Conferencing System, U.S. Pat. No. 5,410,343 to Coddington et al., entitled Video-On-Demand Services Using Public Switched Telephone Network, and U.S. Pat. No. 5,195,086 to Baumgartner et al., entitled Multiple Call Control Method In A Multimedia Conferencing System.

SUMMARY OF THE INVENTION

It is, therefore, an object of the invention to provide a computer conferencing system which can provide synchronization of audio, video and data signals transmitted over a communications link.

In accordance with the present invention, there is provided a computer conferencing system provided with a transmission signal synchronization scheme, which comprises an audio board; a video board; a host processor; and a communication board coupled to the audio board, video board and host processor via a bus and connected to the remote conferencing system via a communications network. Further, the conferencing system includes: a multiplexer/demultiplexer that multiplexes compressed and formatted audio/video/data generated by the audio board, video board and host processor with the communication board for transmission to and reception from the remote conferencing system; a synchronization (sync) signal generator coupled to the compressed signal output of the audio board by way of a mixer for generating a sync signal which the mixer adds to the audio signal frame generated by the audio board; and a synchronization control unit coupled to audio data input lines of the multiplexer/demultiplexer for enabling/disabling addition of the sync signal to the audio signal frame.

In the preferred embodiment of the present invention, the communications network comprises a public switched telephone network (PSTN) or an integrated services data network (ISDN). The audio sync signal is preferably interposed between the header signal and the audio data. In addition, the compressed formatted audio/video/data generated by the remote site is demultiplexed via the demultiplexer in synchronization with the sync signal included in the audio signal frame.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
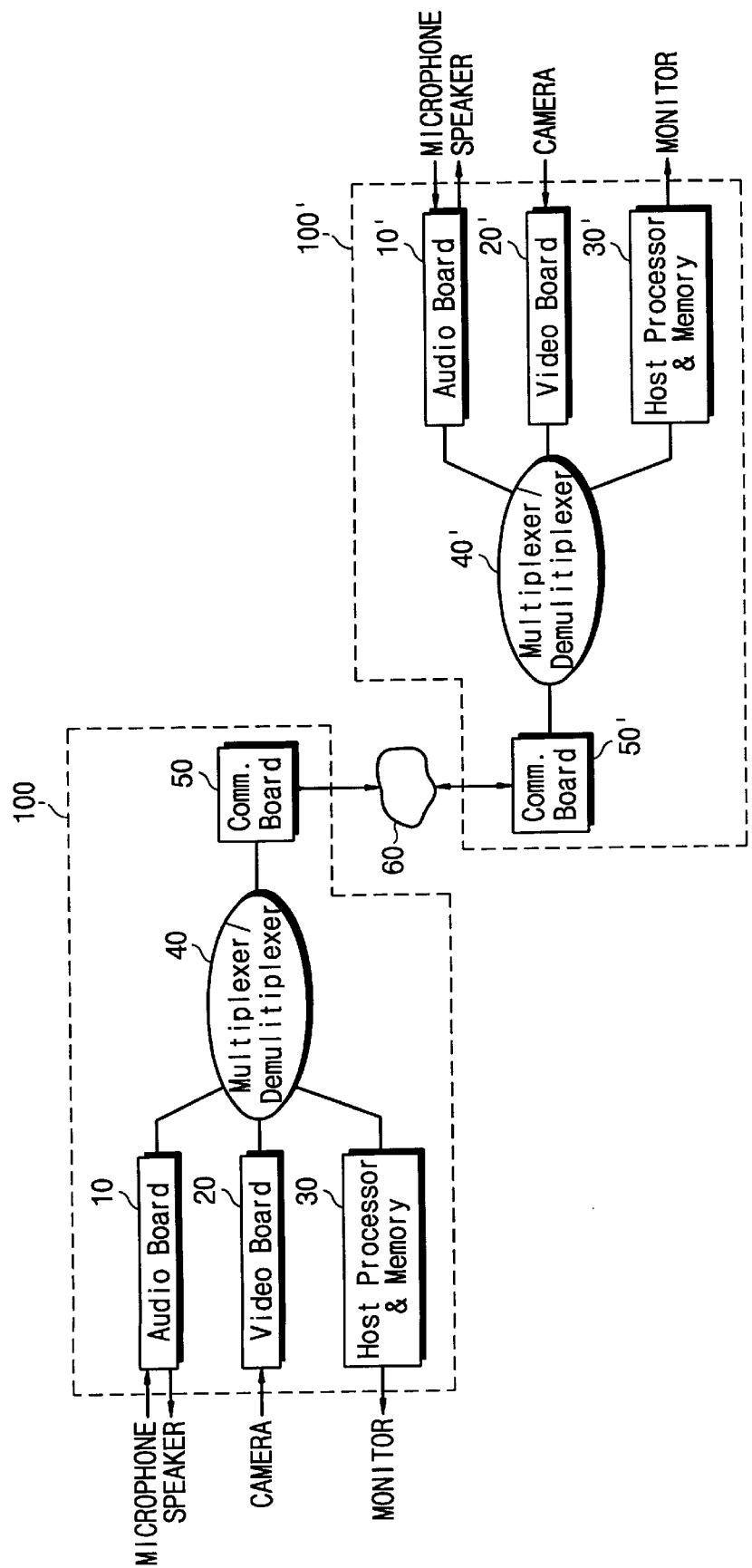
FIG. 1 is a block diagram of an audio, video and data conferencing system interposed between two personal computer systems.

A computer conferencing system can be seen in FIG. 1, for example, in which a conferencing system 100 receives, digitizes, and compresses the analog video signals generated by camera and the analog audio signals generated by a microphone. The compressed digital video and audio signals are transmitted to the other conferencing system 100' via a communications network 60, such as PSTN and ISDN, where they are decompressed and converted for play on a monitor and a speaker, respectively. In addition, each conferencing system may generate and transmit data signals to the other conferencing system for play on its monitor. Detailed hardware and software configurations of the conferencing system can be seen in U. S. Pat. No. 5,434,913 of Tung et al.

Each conferencing system 100 comprises audio board 10, video board 20, host processor 30, and communications board 50. The host processor 30 and the boards 10, 20, 50 are interconnected by an ISA bus. Reference number 40 denotes a multiplexer/demultiplexer that multiplexes compressed and formatted audio/video/data generated by the audio board 10, video board 20, and host processor 30 with the communications board 50 for transmission to and reception from the remote conferencing system 100' over the communications network 60.

During conferencing, audio board 10 and video board 20 digitize analog audio signals and video signals received from the microphone and camera, respectively. The digital audio and video are stored in memories and they are converted into compressed audio and video format for transmission. The formatted audio and video are transmitted to the communication board 50 via the multiplexer 40 for transmission to the remote site. Also, the data generated by the host processor 30 is formatted for transmission.

The communication board 50 also receives from the communications network 60 compressed digitally formatted audio/video/data generated by the remote site. Each data format is demultiplexed via the demultiplexer 40 and transmitted to the respective boards via ISA bus interface. Then, decompression and digital-to-analog conversion of the decompressed data are performed for local playback.

Figure 2:
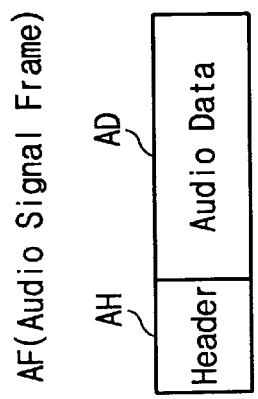
FIG. 2 is a diagram representing a configuration of an audio signal frame generated by the audio board of each conferencing system of FIG. 1.

In this system, audio capture/compression and decompression/playback are preferably performed entirely within the audio and communication boards without going through the host processor 30. As a result, audio is continuously played during a conferencing session regardless of what other applications are running on host processor 30. The formatted audio or audio signal frame consists of a header AH and an audio data AD as shown in FIG. 2. Also, video signal frame consists of a header VH and video data VD, and data signal frame comprises a header DH and data DD.

The audio signal frame is continuously supplied to the multiplexer 40. However, the video signal frame is supplied to the multiplexer 40 at a rate of one to five fiames per second, depends on the video processing speed of the host processor and efficiency of the compression/decoding algorithm. The data signal frame is a random supplier.

Figure 3:
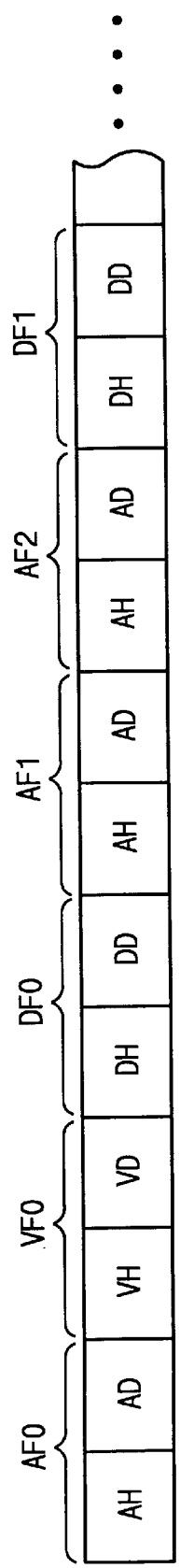
FIG. 3 is a diagram depicting a stream of audio, video and data signal frames transmitted over a communications link of FIG. 1.

A stream of formatted audio/video/data signals is shown in FIG. 3, as an example, where in the midst of audio signal frames AF0, AF1, AF2, a video signal frame VF0 and two data signal frames DF0, DF1 are transmitted.

Such multiplexed audio, video, and data signal streams are transmitted to the remote site asynchronously via the communications network. In case of the PSTN, there occur many errors due to characteristics of the transmission line. This may result in discrepancy between the original data and the received data when demultiplexing of the compressed formatted data is performed at the remote site.

Figure 4:
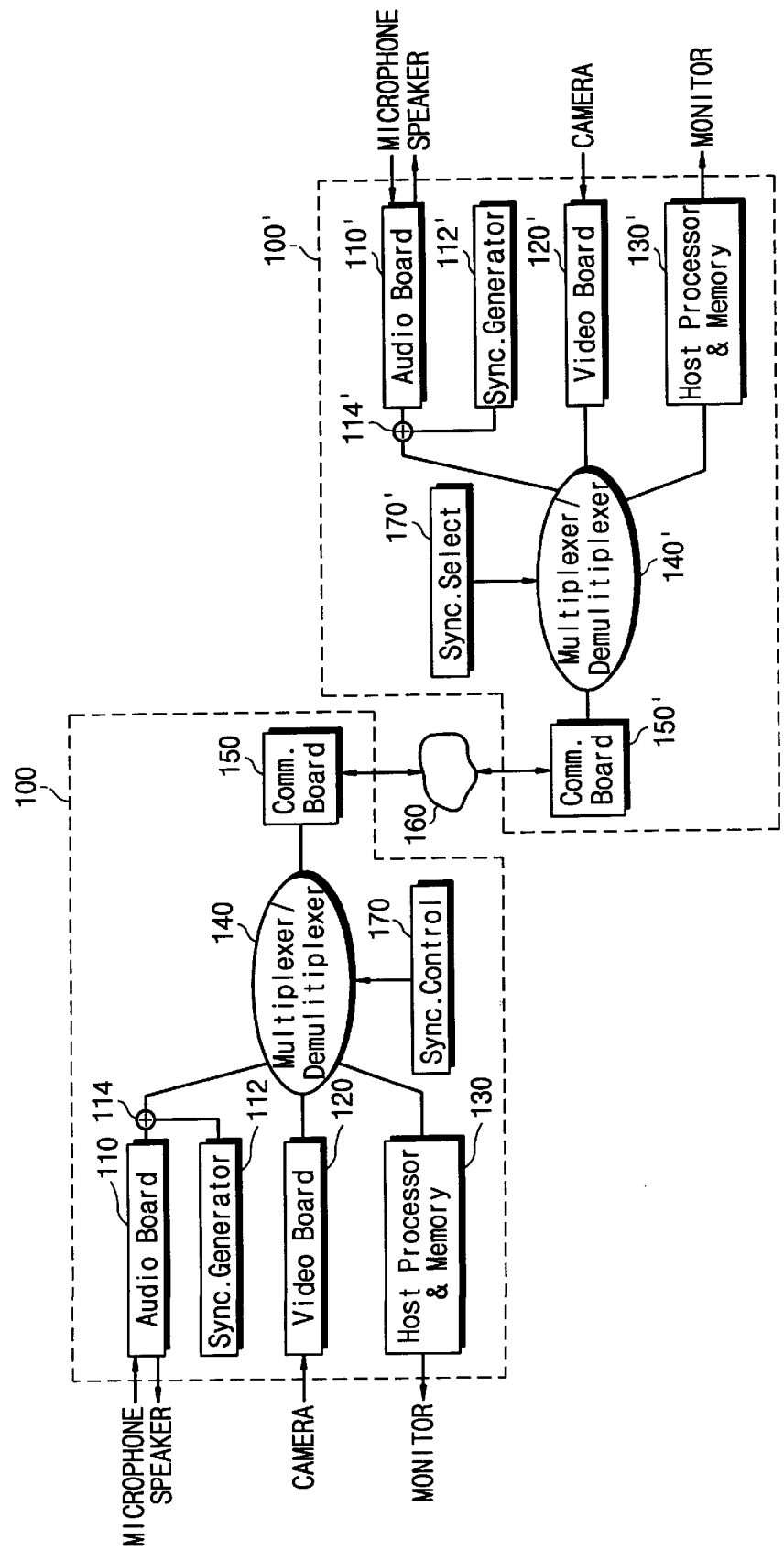
FIG. 4 is a block diagram of audio, video and data conferencing between two personal computer systems, according to a preferred embodiment of the present invention.

Referring to FIG. 4, there is shown a computer conferencing system in which audio, video and data conferencing between two personal computer systems is carried out in accordance with a preferred embodiment of the present invention. Each personal computer system has a conferencing system, a camera, a microphone, a monitor, and a speaker. The conferencing systems communicate via a communications network. A conferencing system 100 receives, digitizes, and compresses the analog video signals generated by a camera and the analog audio signals generated by a microphone. The compressed digital video and audio signals are transmitted to the other conferencing system 100' via a communications network 160, such as PSTN and ISDN, where they are decompressed and converted for play on a monitor and speaker, respectively. In addition, each conferencing system 100 generates and transmits data signals to the other conferencing system for play on a monitor. Configuration of the other conferencing system 100' is preferably identical with that of the conferencing system 100.

Each conferencing system 100 comprises audio board 110, video board 120, host processor 130, and communications board 150. The host processor 130 and the boards 110, 120, 150 are interconnected by an ISA bus. Reference number 140 denotes a multiplexer/demultiplexer that multiplexes compressed and formatted audio/video/data generated by the audio board 110, video board 120 and host processor 130 with the communications board 150 for transmission to and reception from the remote conferencing system 100' over the communications network 160.

A synchronization signal generator 112 is coupled to the compressed audio output of the audio board 110 by way of a mixer 114. In addition, a synchronization (sync) control unit 170 is coupled to audio input lines of the multiplexer/demultiplexer 140. The sync signal generator 112 generates a sync signal and supplies it to the mixer 114 which adds the sync signal to the audio signal frame generated by the audio board 110. The sync control unit 170 enables/disables addition of the sync signal to the audio signal frame.

Figure 5:
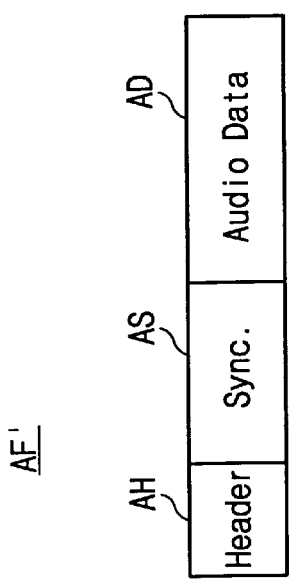
FIG. 5 is a diagram representing a configuration of an audio signal frame in which a synchronization signal is added in accordance with the present invention.

If the sync control unit 170 is determined to add the sync signal to the audio signal frame, the resultant audio signal frame can be exemplified by FIG. 5. There, audio sync signal AS is interposed between header signal AH and audio data AD, following the header signal AH.

Figure 6:
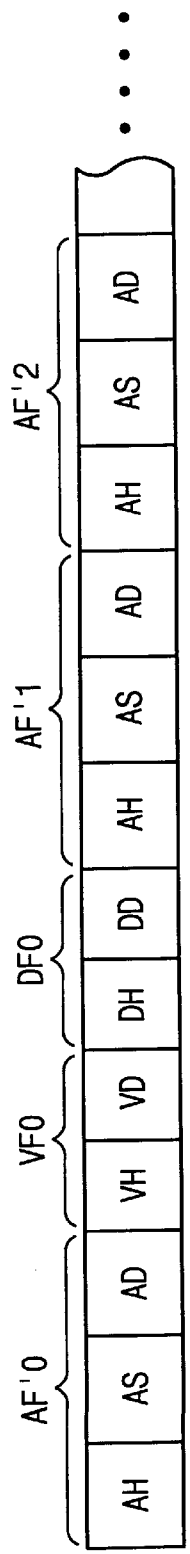
FIG. 6 is a diagram depicting a stream of audio, video and data signal frames transmitted over a communications link of FIG. 4.

During conferencing, audio board 110 digitizes analog audio signals received from a microphone. The digital audio is stored in memory and converted into compressed audio format for transmission. The formatted audio, as shown in FIG. 5, is transmitted to the communication board 150 via the multiplexer 140 for transmission to the remote site. Also, analog video signals received from the camera and data generated by the host processor are formatted for transmission. A stream of formatted audio, video and data signals is shown in FIG. 6, for example. Audio signal frames that include the sync signal AS are denoted by AF'0, AF'1, and AF'2. In the midst of the audio signal frames, video signal frame VF0 and data signal frame DF0 are placed.

The communication board 150 also receives, from the communications network 160, the compressed formatted audio/video/data stream generated by the remote site. Each data format is demultiplexed via the demultiplexer 140 in synchronization with the sync signal included in the audio signal frame. During reception of the data stream, the sync signal of the audio signal frame responds to the sync signal generated by the sync generator 112. Demultiplexed audio, video, and data signal are transmitted to the respective boards via ISA bus interface, and then decompression and digital-to-analog conversion of the decompressed data are performed for local playback.

Figure 7:
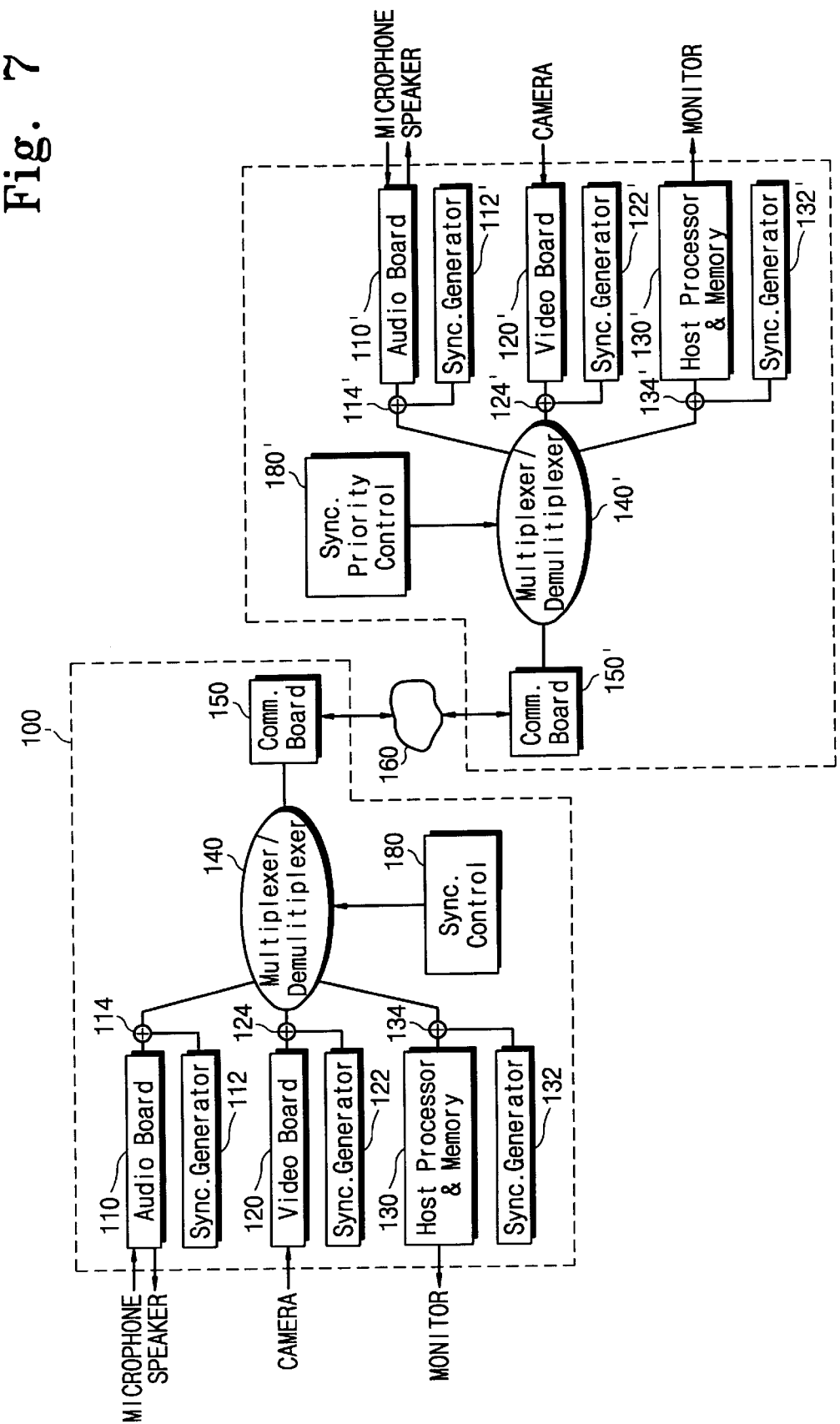
FIG. 7 is a block diagram of audio, video and data conferencing between two personal computer systems, according to another embodiment of the present invention.

FIG. 7 shows another embodiment of the computer conferencing system in accordance with the present invention. The configuration of the conferencing system is similar to that of FIG. 4. Thus, the same or similar components are denoted by the same reference numerals as those in FIG. 4 and detailed description therefor will be omitted. In particular, each of the audio board 110, video board 120, and host processor 130 have their sync signal generator 112, 122, and 132 coupled to signal data output of boards 110, 120, and host processor 130 by way of respective mixers 114, 124, and 134. In addition, a sync control unit 180 is coupled to data input lines of the multiplexer/demultiplexer 140.

Each sync signal generator 112, 122, and 132 generates the respective sync signals and supplies them to the mixers 114, 124, and 134 which add the sync signals to the audio, video, and data signal frames generated by the boards 110, 120, and host processor 130 of the conferencing system. The sync control unit 180 enables/disables addition of a sync signal to the signal frames as well as gives priority to a sync signal provided by one of the sync generator.

Figure 8:
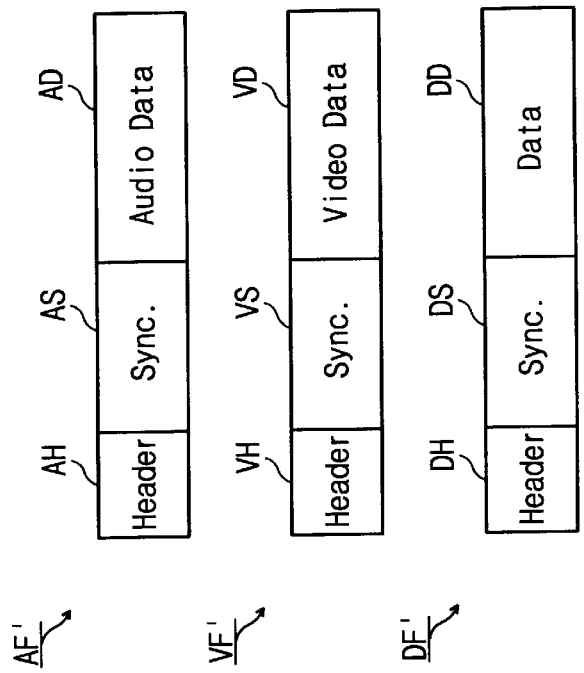
FIG. 8 is a diagram representing a configuration of audio, video and data signal frames used in the conferencing system of FIG. 7.

If the sync control unit 180 is determined to add the sync signal to the audio, video, and data signal frames, the resultant audio, video, and data signal frames AF', VF', DF' can be exemplified by FIG. 8. There, audio sync signal AS, video sync signal VS, and data sync signal DS are interposed between their header signal AH, VH, DH and data signal AD, VD, DD, respectively.

Further, the sync control unit 180 also controls the multiplexer/demultiplexer 140 to give priority to one of audio sync signal AS, video sync signal VS, and data sync signal DS selectively by a software module which resides and runs on host processor 130. The software application may include a table for operator selection of an operation mode for giving priority on the sync signals. An example of the mode selection table is shown below:

TABLE 1

| PRIORITY MODE | FIRST | SECOND | THIRD |
|---|---|---|---|
| #1 | AS | VS | DS |
| #2 | VS | DS | AS |
| #3 | DS | AS | VS |
| ... | ... | ... | ... |
| #n | | User Programmable | |

The system operator may choose mode number 3 in the table in order to give priority to the data sync signal DS when the data signal frame is considered most important during conferencing. The mode number 1 is preferably set to a default value since the audio signal frame normally has the priority over the other signal frames.

Figure 9:
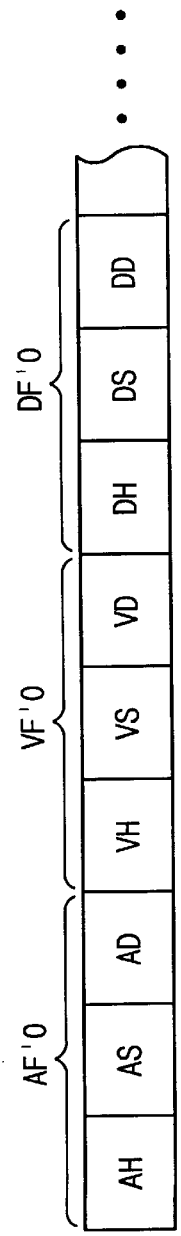
FIG. 9 is a diagram depicting a stream of audio, video and data signal frames transmitted over a communications link in the conferencing system of FIG. 7.

During conferencing, audio board 110 digitizes analog audio signals received from a microphone. The digital audio is stored in memory and is converted into compressed audio format for transmission. Also, analog video signals received from the camera and data generated by the host processor are formatted for transmission. The formatted audio, video, and data signal frames AF', VF', DF' are transmitted to the communication board 150 via the multiplexer 140 for transmission to the remote site over the communications network 160. A stream of formatted audio, video, and data signals is shown in FIG. 9, for example. In the drawing, audio signal frames that include the sync signal AS are denoted by AF'0. Also, video signal frame VF'0 and data signal frame DF'0 that include the video sync signal VS and data sync signal DS, respectively, are followed by the audio signal frame.

The communication board 150 also receives from the communications network 160 the formatted audio/video/data stream generated by the remote site. Each data format is reconstructed via the demultiplexer 140 in synchronization with the sync signals included in any of the signal frames. During reception of the data stream, the sync signal of a signal frame responds to the sync signal generated by the corresponding sync generator. Also, the sync signal of a specific signal frame can selectively respond to the sync signal generated by the sync generator which is set to have the same priority as that in the remote site. Demultiplexed audio, video, and data signal are sent to the respective boards via ISA bus interface, and then decompression and digital-to-analog conversion of the decompressed data are performed for local playback.

As is apparent from the foregoing, the computer conferencing system of the present invention provides for a maximization of the data integrity during conferencing due to synchronization of the most significant formatted signal transmitted over a communications link. Further, since priority for a specific formatted signal can be selected at the user level by selecting a sync signal source, user convenience and efficiency in transmission of the sync signal with the formatted signal are provided.

While the invention has been described in terms of an exemplary embodiment, it is contemplated that it may be practiced as outlined above with modifications within the spirit and scope of the appended claims.

What is claimed is:

1. A computer conferencing system provided with a transmission signal synchronization scheme, wherein the conferencing system provides real-time audio, video and data conferencing between personal computer systems, said system comprising:

an audio board, a video board, and a host processor;

a communication board coupled to the audio board, the video board and the host processor via a bus and connected to a remote conferencing system via a communications network;

multiplexer/demultiplexer means disposed between the audio board, the video board and the host computer, on the one hand, and the communications board, on the other hand, for multiplexing compressed and formatted audio, video and data generated by the audio board, video board and host processor, respectively, and providing a multiplexed output to the communication board for transmission to the remote conferencing system;

a mixer coupled between a compressed signal output of the audio board and said multiplexer/demultiplexer means;

a synchronization signal generator coupled to the mixer for generating a sync signal and supplying it to the mixer for addition of the sync signal to an audio signal frame generated by the audio board; and synchronization control means coupled to audio data input lines of the multiplexer/demultiplexer means for selectively enabling and disabling addition of the sync signal to the audio signal frame.

2. The computer conferencing system of claim 1, wherein the communications network comprises one of a PSTN and an ISDN network.

3. The computer conferencing system of claim 1, wherein the sync signal is interposed between a header signal and the audio data.

4. The computer conferencing system of claim 1, wherein compressed and formatted audio, video and data generated by the remote conferencing system are demultiplexed via the multiplexer/demultiplexer means in synchronization with the sync signal included in the audio signal frame.

5. A computer conferencing system provided with a transmission signal synchronization scheme, wherein the conferencing system provides real-time audio, video and data conferencing between personal computer systems, said system comprising:

an audio board, a video board, and a host processor;

a communication board coupled to the audio board, the video board the and the host processor and connected to a remote conferencing system via a communications network;

multiplexer/demultiplexer means disposed between the audio board, the video board and the host computer, on the one hand, and the communications board, on the other hand, for multiplexing compressed and formatted audio, video and data generated by the audio board, video board and host processor, respectively, for transmission to the remote conferencing system;

a plurality of mixers each of said mixers being connected to a respective one of the audio board, the video board and the host processor;

a synchronization signal generator coupled to said mixers for generating corresponding sync signals which are added to the audio, video and data signal frames, respectively; and synchronization control means coupled to data input lines of the multiplexer/demultiplexer means for selectively enabling and disabling addition of the sync signals to the audio, video and data signal frames, respectively, and for selecting a signal source according to a priority set by a software module.

6. The computer conferencing system of claim 5, wherein the communications network comprises one of a PSTN and an ISDN network.

7. The computer conferencing system of claim 5, wherein the sync signals are interposed between header signals and data.

8. The computer conferencing system of claim 5, wherein compressed and formatted audio, video and data generated by the remote conferencing system are demultiplexed by the multiplexer/demultiplexer means in synchronization with a sync signal included in a specified signal frame set by the user.

9. The computer conferencing system of claim 5, wherein the sync signal of a specific signal frame selectively responds to the sync signal generated by the sync generator which is set to have the same priority as that in the remote conferencing system.

10. A computer conferencing system provided with a transmission signal synchronization scheme, comprising:

generating means for generating at least one of audio, video and data;

multiplexer/demultiplexer means connected to said generating means for compressing, formatting and multiplexing said at least one of said audio, video and data generated by said generating means to produce a compressed and formatted output;

communication board means coupled to said multiplexer/demultiplexer means for receiving said compressed, formatted and multiplexed output and for providing said compressed, formatted and multiplexed output to another computer conferencing system via a network;

synchronization signal generator means associated with said generating means for generating at least one sync signal; and mixer means connected to at least one output of said generating means and to said synchronization signal generating means for adding said at least one sync signal to said at least one of said audio, video and data generated by said generating means.

11. The computer conferencing system of claim 10, further comprising synchronization control means coupled to said multiplexer/demultiplexer means for selectively enabling and disabling addition of said sync signal to said at least one of said audio, video and data generated by said generating means.

12. The computer conferencing system of claim 10, wherein the communications network comprises one of a PSTN and an ISDN network.

13. The computer conferencing system of claim 10, wherein said at least one sync signal is interposed between a header signal and said at least one of said audio, video and data generated by said generating means.

14. The computer conferencing system of claim 10, wherein said multiplexer/demultiplexer means receives and demultiplexes at least one of compressed and formatted audio, video and data generated by said another computer conferencing system in synchronization with said at least one sync signal.

15. The computer conferencing system of claim 10, wherein said generating means comprises an audio board generating an audio output.

16. The computer conferencing system of claim 10, wherein said generating means comprises a video board generating a video output.

17. The computer conferencing system of claim 10, wherein said generating means comprises a host processor generating a data output.

* * * * *